United States Patent [19]

Mäusezahl

[11] Patent Number: 4,487,610
[45] Date of Patent: Dec. 11, 1984

[54] COLD WATER SOLUBLE ANTHRAQUINONE DYESTUFF COMPOSITION

[75] Inventor: Dieter Mäusezahl, Biel-Benken, Switzerland

[73] Assignee: Ciba-Geigy Corporation, Ardsley, N.Y.

[21] Appl. No.: 520,879

[22] Filed: Aug. 5, 1983

Related U.S. Application Data

[63] Continuation-in-part of Ser. No. 401,582, Jul. 26, 1982, abandoned.

[30] Foreign Application Priority Data

Jun. 14, 1982 [CH] Switzerland .......................... 3670/82

[51] Int. Cl.³ .............................................. C09B 67/24
[52] U.S. Cl. ........................................ 8/524; 8/589; 8/597; 8/676; 8/680; 8/924
[58] Field of Search ............................ 8/524, 597, 676

[56] References Cited

U.S. PATENT DOCUMENTS

| | | | |
|---|---|---|---|
| 1,131,516 | 3/1915 | Herzberg et al. | 260/374 |
| 2,834,773 | 5/1958 | Scalera et al. | 260/148 |
| 3,963,418 | 6/1976 | Tullio | 8/527 |
| 4,014,646 | 3/1977 | Tullio | 8/602 |
| 4,058,480 | 11/1977 | Lohmann et al. | 8/524 |

FOREIGN PATENT DOCUMENTS

| | | |
|---|---|---|
| 57158 | 8/1982 | European Pat. Off. |
| 945643 | 6/1956 | Fed. Rep. of Germany |
| 54-149732 | 11/1979 | Japan |
| 55-104359 | 8/1980 | Japan |

*Primary Examiner*—A. Lionel Clingman
*Attorney, Agent, or Firm*—Edward McC. Roberts

[57] ABSTRACT

A cold water soluble dyestuff composition which contains
(a) 30 to 90% by weight of the dye of formula I

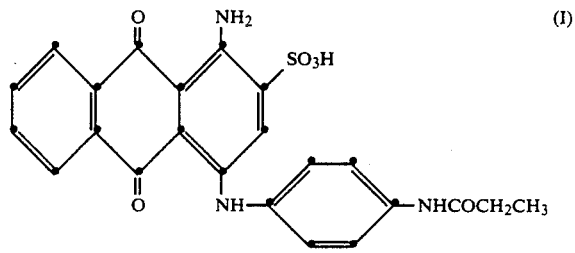

(b) 2 to 50% by weight of an anionic dispersant
(c) 0.1 to 10% by weight of an alkylenediaminedicarboxylic, -tricarboxylic or -tetracarboxylic acid of the formula II

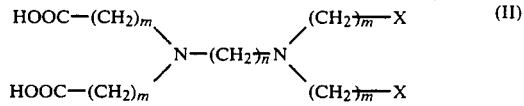

wherein
X is a carboxyl group or the nitrilo group, m is 1 to 3 and n is 2 to 5, or a salt thereof, and optionally further ingredients.

The assistant combination of anionic dispersant and alkylenediaminedicarboxylic, -tricarboxylic or -tetracarboxylic acid imparts to the composition a cold water solubility of 30 g/l. The composition is suitable for dyeing and printing textile material, especially that made from synthetic polyamide.

12 Claims, No Drawings

COLD WATER SOLUBLE ANTHRAQUINONE DYESTUFF COMPOSITION

This is a continuation-in-part of my copending application Ser. No. 401,582, filed July 26, 1982, now abandoned.

The present invention relates to a cold water soluble dyestuff composition, to the preparation thereof and to the use of said composition for dyeing or printing textile material.

The dye of the formula I

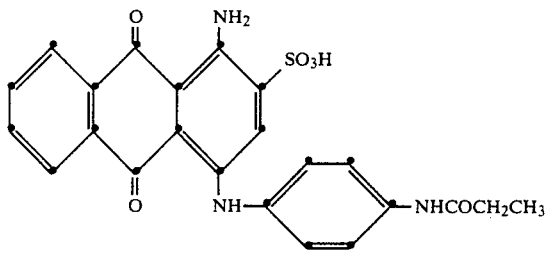

is known from German patent specification 945 643. Intense blue dyeings are obtained on polyamide and wool with this dye. The dye is readily soluble in warm water; but when charged into cold water the dye powder has a propensity to form lumps and is of only limited solubility. For example, at room temperature the solubility is less than 5 g/l without the formation of residue.

The present invention has for its object to improve substantially the cold water solubility of the above dye and to increase it such that a solubility of about 30 g/l in water of 20° C. is attained.

This object is accomplished by using a composition comprising the dye of formula I, an anionic dispersant and an alkylenediaminedicarboxylic, -tricarboxylic or -tetracarboxylic acid.

Accordingly, the present invention relates to a cold water soluble dyestuff composition which contains
(a) 30 to 90% by weight of the dye of formula I,
(b) 20 to 50% by weight of an anionic dispersant,
(c) 0.1 to 10% by weight of an alkylenediaminedicarboxylic, -tricarboxylic or -tetracarboxylic acid of the formula II

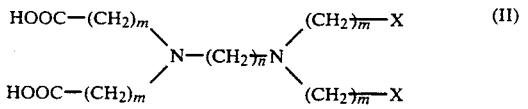

wherein
X is a carboxyl group or the nitrilo group, m is 1 to 3 and n is 2 to 5, or a salt thereof; and optionally further ingredients.

The anionic dispersant is one of the conventional dispersants for water-soluble dyes, in particular a condensation product of formaldehyde and an aromatic sulfonic acid or a lignosulfonate. Typical examples of formaldehyde condensates are condensation products of formaldehyde and naphthalenesulfonic acids or of formaldehyde, naphthalenesulfonic acid and benzenesulfonic acid, or a condensation product of crude cresol, formaldehyde and naphthalenesulfonic acid, as well as condensates of phenol-, cresol- or naphtholsulfonic acid and formaldehyde. Other suitable anionic dispersants are polyphosphates of medium to high molecular weight.

A suitable alkylenediaminedicarboxylic acid of the formula II is e.g. ethylenediamine-N-dicyanomethylenediacetic acid.

A suitable alkylenediaminetricarboxylic acid of the formula II is e.g. ethylenediamine-N-cyanomethylenetriacetic acid or propylenediamine-N-cyanomethylenetriacetic acid.

A suitable alkylenediaminetetracarboxylic acid, is in addition to propylenediaminetetraacetic acid and propylenediaminetetrapropionic acid, in particular ethylenediaminetetraacetic acid.

The alkylenediaminedicarboxylic, -tricarboxylic or -tetracarboxylic acids are used as such or in the form of their salts. The alkali metal salts are preferred.

As further ingredients the composition of this invention may additionally contain e.g. extenders such as dextrin, urea or an inorganic salt, e.g. sodium chloride or sodium sulfate, as well as a wetting agent such as nonylphenol diglycol ether sulfate or dodecylbenzene sulfonate, or an antifoam, a dust inhibitor and/or a binder.

A dyestuff composition having particularly good cold water solubility comprises
(a) 60 to 80% by weight of the dye of formula I
(b) 5 to 15% by weight of lignosulfonate
(c) 0.5 to 3% by weight of an alkali metal salt of ethylenediaminetetraacetic acid.

The composition of this invention is obtained e.g. by mixing the dye of formula I with an anionic dispersant, an alkylenediaminedicarboxylic, -tricarboxylic or -tetracarboxylic acid of the formula II or an alkali metal salt thereof, and optionally further ingredients, the carboxylic acid of the formula II being added direct to the aqueous solution of the crude dye after removal of copper hydroxide, and/or to the isolated dye. The individual components may be in solid form—the dye e.g. as filter cake—or in the form of an aqueous suspension or solution. If an aqueous suspension is used, the individual components can also be ground wet with one another instead of being simply mixed. The homogeneous suspension is conveniently dried by spray drying, if appropriate after being concentrated. Concentration is effected e.g. by hyperfiltration. Further ingredients, such as extenders or dust inhibitors, may be added before or also after the spray drying.

The addition of the assistant combination of anionic dispersant and alkylenediaminedicarboxylic, -tricarboxylic or -tetracarboxylic acid also substantially increases the solubility of the dye in hot water in addition to its solubility in cold water. For example, solubilities in excess of 150 g of composition per liter in hot water of 90° C. are obtained. In addition, such solutions are completely stable when kept for a prolonged period of time at elevated temperature, whereas the dye by itself alone gives less concentrated solutions which are not stable at elevated temperature and from which the dye partially crystallises in time.

The dyestuff composition of the invention is used for preparing dye baths, padding liquors or printing pastes. These are suitable for dyeing or printing in particular textile material, e.g. made from natural and, preferably, synthetic polyamide.

The invention is illustrated by the following Examples, in which parts and percentages are by weight.

EXAMPLE 1

Preparation of the dye of formula I

The dye of formula I is prepared by condensation of 1-amino-4-bromo-anthraquinone-2-sulfonic acid with p-aminopropionanalide in aqueous solution. The dye is precipitated from the reaction solution with sodium chloride and subsequently dried at 80° C. The dye has a solubility in water, as defined below, of about 30 g/l and a cold water solubility of less than 5 g/l.

The water solubility is determined as follows:

2 g, 3 g, 4 g and 5 g respectively of the dye are charged into 100 ml of distilled water and heated for 10 minutes to 90°0 C. The clear solutions obtained are filtered hot and no dye residue remains on the filter paper. After they have cooled, the solutions are left to stand for 24 hours at 20°–25° C. and again filtered through a paper filter. Distinct filter residues are obtained from the solutions having a concentration of 40 and 50 g/l. The solutions containing the dye in concentrations of 20 and 30 g/l can be filtered without leaving any residues.

The cold water solubility is determined as follows:

A specific amount of the dye is stirred into 200 ml of demineralised water of 20° C. and stirring is continued for a further 2 minutes (magnetic stirrer, 750 rpm; 400 ml glass beaker). The dye solution is then filtered through a paper filter (SS 1450 CV; diameter 7 cm) and rinsed with 50 ml of demineralised water. The cold water solubility is expressed as the limit concentration of the dye solution which can be filtered without leaving any residue.

EXAMPLE 2

100 g of the untreated dye of the formula I

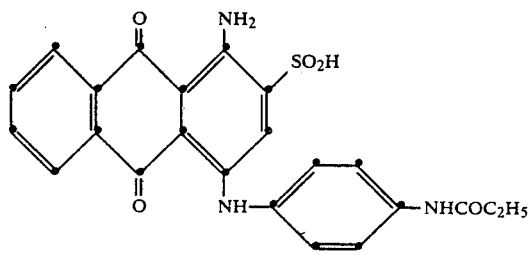

2 g of the sodium salt of ethylenediaminetetraacetic acid and 8 g of lignosulfonate are mixed in a laboratory mixer for 5 minutes to a homogeneous powder. The resultant dyestuff composition has a water solubility of 70 g/l and a cold water solubility of 30 g/l.

EXAMPLES 3

15 parts of the dyestuff composition obtained in Example 2 are dissolved in 500 parts of cold water. This solution is then added to a solution containing 3 parts of a carob bean gum thickener, 5 parts of a coacervate-forming padding assistant derived from a condensation product of a higher molecular fatty acid with an oxyalkyl-amine, 2 parts of monosodium phosphate crystals and 1 part of disodium phosphate crystals in 450 parts of cold water. The bath is then bulked to 1000 parts with water. An untreated nylon tufted carpet is then impregnated with 300% of this liquor, based on the weight of the carpet, at a rate of advance of 8 m/min. The impregnated carpet passes into a loop steamer, where it is treated with saturated steam for 10 minutes at 98°–100° C. The carpet is then washed in an open-width washing machine. A level blue dyeing is obtained on the carpet.

Without the addition of the assistant combination, the cold water solubility of the dye is less than 5 g/l. The dye by itself alone is therefore unsuitable for this utility.

EXAMPLE 4

160 parts of the dyestuff composition obtained in Example 2 are dissolved in 1000 parts of water at 90° C. A sample of the solution can be filtered without leaving any residue. With gentle stirring, the solution is kept for 17 hours at a temperature of 90° C. A sample of the solution is again taken after 17 hours and filtered. It also leaves no residue on the filter paper.

If the dye by itself alone is used instead of the dyestuff composition, then it is possible to dissolve only 80 g of it in 1000 parts of water at 90° C. The dye partially crystallises out if this solution is gently stirred for 17 hours at 90° C. The dye by itself alone can therefore not be used in dyehouses for the preparation of concentrated stock solutions.

EXAMPLE 5

1-Amino-4-bromoanthraquinone-2-sulfonic acid is condensed at pH 8.5 to 9.5 with p-aminopropionanilide by means of copper(I) catalysis. The condensation product—the dye of formula I—precipitates and soluble by-products are removed by filtration. The filter residue is dissolved in hot water and insoluble copper hydroxide is removed by clarifying filtration. The dye solution is then concentrated to a quarter of its volume by hyperfiltration. Then 2% of the sodium salt of ethylenediaminetetraacetic acid and 20% of lignosulfonate are added (each based on the theoretical yield of dye) and the mixture is dried by spray drying. The free-flowing dyestuff powder so obtained is adjusted to ordinary commercial standard concentration by adding dextrin. The final dye formulation has a cold water solubility of 30 g/l.

EXAMPLE 6

The dye of formula I obtained by Cu(I) catalysed condensation of 1-amino-4-bromoanthraquinone-2-sulfonic acid with p-aminopropionanilide is dissolved in hot water and a residue of copper hydroxide is removed by clarifying filtration. Then 4% (based on the dye) of the sodium salt of ethylenediaminetetraacetic acid is added to the aqueous solution and the dye is subsequently precipitated with sodium choride. The dye is isolated by filtration and the moist filter cake with a solids content of about 40% is dried in a paddle drier. Before the grinding procedure, 5% of sodium polyphosphate (Calgon T ®) is added to the dry dye and finally the dye powder is adjusted to ordinary commercial standard concentration with dextrin. The final dye formulation has a cold water solubility of 30 g/l.

What is claimed is:

1. A cold water soluble dyestuff composition consisting essentially of (a) 30 to 90% by weight of the dye of formula I

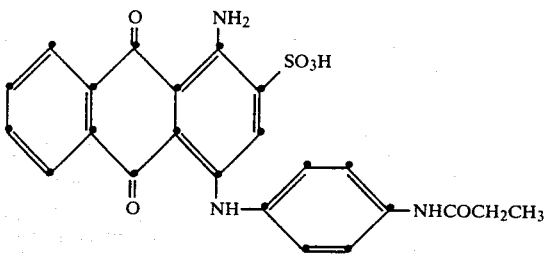

(I)

(b) 2 to 50% by weight of an anionic dispersant
(c) 0.1 to 10% by weight of an alkylenediaminedicarboxylic, -tricarboxylic or -tetracarboxylic acid of the formula II

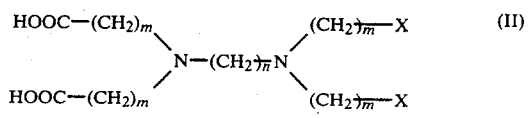

(II)

wherein

X is a carboxyl group or the nitrilo group, m is 1 to 3 and n is 2 to 5, or a salt thereof, and optionally further ingredients.

2. A dyestuff composition according to claim 1, wherein the anionic dispersant is a lignosulfonate or a naphthalenesulfonic acid/formaldehyde condensate.

3. A dyestuff composition according to claim 1, wherein the alkylenediaminetetracarboxylic acid is ethylenediaminetetraacetic acid or a salt thereof.

4. A dyestuff composition according to claim 1, which contains as further ingredients an antifoam, an extender, a wetting agent, a binder and/or a dust inhibitor.

5. A dyestuff composition containing
 (a) 60 to 80% by weight of the dye of formula I
 (b) 5 to 15% by weight of lignosulfonate and
 (c) 0.5 to 3% by weight of an alkali metal salt of ethylenediaminetetraacetic acid.

6. A process for the preparation of the dyestuff composition as claimed in claim 1, which process comprises mixing the dye of formula I with an anionic dispersant, an alkylenediaminedicarboxylic, -tricarboxylic or -tetracarboxylic acid of the formula II, and optionally further ingredients.

7. A process according to claim 6, which comprises mixing or grinding the individual components in the form of an aqueous suspension with one another and subsequently drying said aqueous suspension.

8. A process according to claim 7, wherein drying is effected by spray drying.

9. The dyestuff composition obtained by the process as claimed in either of claims 6 or 7.

10. A method of dyeing or printing a polyamide textile material, which comprises the use of a composition as claimed in claim 1.

11. A dyestuff composition according to claim 1, wherein the anionic dispersant is a polyphosphate.

12. A process according to claim 6, which comprises mixing the dye of formula I obtained by Cu(I) catalysed condensation of 1-amino-4-bromoanthraquinone-2-sulfonic acid with p-aminopropionanilide, with an anionic dispersant, a carboxylic acid of the formula II, and optionally further ingredients, the carboxylic acid being added directly to the aqueous solution of the crude dye after removal of copper hydroxide, and/or to the isolated dye.

* * * * *